(12) United States Patent
Cho

(10) Patent No.: US 11,176,603 B2
(45) Date of Patent: Nov. 16, 2021

(54) RENTAL VEHICLE OPERATION MANAGEMENT SYSTEM

(71) Applicants: Jaesung Cho, Suzaka (JP); Soonsung Cho, Nagano (JP); Hiroshi Takemoto, Nagano (JP); Ryoko Takemoto, Suzaka (JP)

(72) Inventor: Jaesung Cho, Suzaka (JP)

(73) Assignees: Jaesung Cho, Suzaka (JP); Soonsung Cho, Nagano (JP); Hiroshi Takemoto, Nagano (JP); Ryoko Takemoto, Suzaka (JP)

( * ) Notice: Subject to any disclaimer, the term of this patent is extended or adjusted under 35 U.S.C. 154(b) by 379 days.

(21) Appl. No.: 16/321,948

(22) PCT Filed: Feb. 7, 2018

(86) PCT No.: PCT/JP2018/004186
§ 371 (c)(1),
(2) Date: Jan. 30, 2019

(87) PCT Pub. No.: WO2019/130602
PCT Pub. Date: Jul. 4, 2019

(65) Prior Publication Data
US 2020/0013112 A1 Jan. 9, 2020

(30) Foreign Application Priority Data
Dec. 29, 2017 (CN) .......................... 201711477665.1

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0645* (2013.01); *G06Q 30/0226* (2013.01); *G06Q 30/0267* (2013.01)

(58) Field of Classification Search
CPC ............ G06Q 30/0207–0277; G06Q 30/0645
See application file for complete search history.

(56) References Cited

U.S. PATENT DOCUMENTS 5,841,351 A * 11/1998 Rey ......................... G07F 17/10
340/432
8,768,565 B2 * 7/2014 Jefferies ................. G07C 5/008
701/32.7

(Continued)

FOREIGN PATENT DOCUMENTS

| CN | 101320495 A | 12/2008 |
|---|---|---|
| CN | 101527061 A | 9/2009 |

(Continued)

OTHER PUBLICATIONS

Barth, Matthew, et al. "Intelligent Transportation System Technology in a Shared Electric Vehicle Program." University of California-Riverside, 2000. (Year: 2000).*

(Continued)

*Primary Examiner* — Luis A Brown
(74) *Attorney, Agent, or Firm* — Muncy, Geissler, Olds & Lowe, P.C.

(57) ABSTRACT

The present issue provides a rental vehicle operation management system which not only enables a facility provider to enjoy advantages corresponding to a degree of contribution thereof to a rental vehicle system operation but also enables the user side to enjoy advantages.

The rental vehicle operation management system (100) includes, as means for solution, a user terminal (200) and a management server (300) capable of connecting to a network (400), a user reads information about a rental vehicle (500) from a rental vehicle tag (510) and transmits the read information together with terminal position information detected by a terminal position information detection unit (240) to the management server (300), and a server-side (Continued)

action control unit (330) refers to a user information database (321), a facility unique information database (322), and a rental vehicle unique information database (323) stored in a server-side storage unit (320) based on the received information and imparts points to a return destination facility provider for the rental vehicle (500) and the user.

18 Claims, 2 Drawing Sheets

(56) References Cited

U.S. PATENT DOCUMENTS

| | | | | |
|---|---|---|---|---|
| 9,373,201 | B2* | 6/2016 | Jefferies | B60R 25/2018 |
| 9,460,573 | B1* | 10/2016 | Cordes | G06K 7/10138 |
| 9,710,975 | B2* | 7/2017 | Jefferies | B60R 25/2018 |
| 9,913,086 | B1* | 3/2018 | Akhter | H04W 4/021 |
| 10,013,697 | B1* | 7/2018 | Cote | G06Q 30/0208 |
| 2001/0037298 | A1* | 11/2001 | Ehrman | G06Q 10/02 705/40 |
| 2005/0108089 | A1* | 5/2005 | Ehrman | G06Q 10/025 705/13 |
| 2006/0161320 | A1* | 7/2006 | Cahoon | B60R 25/24 701/36 |
| 2007/0093215 | A1* | 4/2007 | Mervine | G07F 17/0057 455/99 |
| 2011/0313937 | A1* | 12/2011 | Moore, Jr. | G07C 9/00896 705/307 |
| 2013/0317693 | A1* | 11/2013 | Jefferies | G07C 5/008 701/31.5 |
| 2014/0309842 | A1* | 10/2014 | Jefferies | G07B 15/00 701/31.5 |
| 2015/0348179 | A1* | 12/2015 | Kamisawa | G06Q 10/02 705/5 |
| 2016/0140649 | A1* | 5/2016 | Kleve | H04W 12/04 705/307 |
| 2016/0297398 | A1* | 10/2016 | Jefferies | G07B 15/00 |
| 2017/0076515 | A1* | 3/2017 | Nyalamadugu | G07C 5/008 |
| 2019/0156379 | A1* | 5/2019 | Igata | G07B 15/00 |
| 2020/0013112 | A1* | 1/2020 | Cho | G06Q 30/0267 |
| 2020/0092711 | A1* | 3/2020 | Chen | H04W 8/183 |
| 2020/0258018 | A1* | 8/2020 | Brady | G06Q 10/08 |

FOREIGN PATENT DOCUMENTS

| | | |
|---|---|---|
| CN | 103714628 A | 4/2014 |
| JP | 2003228745 A | 8/2003 |
| JP | 2004030454 A | 1/2004 |
| JP | 2010055583 A | 3/2010 |
| JP | 2011248813 A | 12/2011 |
| JP | 2014194805 A | 10/2014 |
| JP | 2017037506 A | 2/2017 |
| KR | 10-2012-0137524 A | 12/2012 |
| KR | 10-1612286 B1 | 4/2016 |
| TW | 201417031 A | 5/2014 |

OTHER PUBLICATIONS

Savelsbergh, M.W.P. "The General Pickup and Delivery Problem." Transportation Science, vol. 29, No. 1, Feb. 1995. (Year: 1995).*
Rillings, James, et al. "Advanced Driver Information Systems." IEEE Transactions in Vehicular Technology, vol. 40, No. 1, Feb. 1991. (Year: 1991).*
The extended European search report of EP patent application No. 18859939 dated Sep. 9, 2020.
Notification of Ground for Refusal of the corresponding KR patent application No. 10-2019-7014680 dated Sep. 25, 2020.
An office action of a corresponding TW patent application No. 107140833 dated Feb. 10, 2020 and English translation thereof.

* cited by examiner

RENTAL VEHICLE OPERATION MANAGEMENT SYSTEM

TECHNICAL FIELD

The present invention relates to a rental vehicle operation management system that executes management in a period from the beginning of use until the return with respect to rental or sharing of bicycles or motorcycles.

BACKGROUND ART

Systems for renting bicycles at low rates or for free for the purpose of easing of traffic congestion, prevention of noise, or prevention of air pollution in urban areas have become seen not only in Japan but also throughout the world. In some cases, such rental cycle systems may be initiated or managed by local governments or may be managed by private and public sectors in cooperation.

As a rental cycle system such as that mentioned above, the content such as described in PTL 1 has been filed as a patent application. In the system described in PTL 1, a two-dimensional code is previously attached to a bicycle targeted for rental, and, moreover, a two-dimensional code is also previously attached to a storage location for bicycles. Users perform rental and return through the use of reading the two-dimensional code attached to the bicycle and the two-dimensional code attached to the storage location.

Moreover, in a rental cycle system described in PTL 2, a unique two-dimensional barcode is previously attached to a predetermined position of the body of a bicycle targeted for rental, and the confirmation of identity of a user is automatically performed with the two-dimensional barcode being read by a two-dimensional barcode reading function-equipped mobile phone, for user identification that is based on a specific mobile phone, so that whether to give a use authorization to the user is confirmed.

CITATION LIST

Patent Literature

PTL 1: JP-A-2011-248813
PTL 2: JP-A-2010-55583

SUMMARY OF INVENTION

Technical Problem

According to the configurations of rental cycle systems disclosed in PTL 1 and PTL 2, it becomes possible to easily use a rental cycle system with use of a communication device such as a mobile phone or smartphone. However, both rental cycle systems are configured to be dedicated to advantages which the user side is able to enjoy, and does not have a sufficient configuration with respect to advantages which the operator side (specifically, a facility provider) of a rental cycle system is able to enjoy, thus having not yet led to promoting the sufficient spread of rental cycle systems.

Moreover, even if, to expand use of rental cycle systems, a configuration which enables the facility provider to enjoy advantages is employed, unless there are advantages for users, operations of the rental cycle system as a whole would problematically become unestablished.

Solution to Problem

Therefore, the present invention has an object to provide a rental vehicle operation management system, such as a rental cycle system, the rental vehicle operation management system not only enabling a facility provider to enjoy advantages corresponding to a degree of contribution thereof to a rental vehicle system operation but also enabling the user side to enjoy advantages.

The inventor has succeeded in attaining the above-mentioned object by employing the following configuration. More specifically, the present invention is directed to a rental vehicle operation management system which includes a user terminal and a management server capable of connecting to a network and performs operation management of rental vehicles with the user terminal and the management server operating in cooperation with each other via the network, wherein the user terminal includes a terminal-side storage unit on which a terminal-side control program is installed and in which user information is accumulated, a terminal position information detection unit capable of detecting terminal position information about the user terminal, a rental vehicle unique information reading unit capable of reading unique information about a rental vehicle via a rental vehicle tag attached to the rental vehicle, a terminal-side communication unit capable of connecting to the network, and a terminal-side action control unit configured to supply at least the user information, the terminal position information, and the unique information about the rental vehicle to the management server provided on the network via the terminal-side communication unit, wherein the management server includes a server-side storage unit in which each of a user information database having the user information accumulated therein, a rental vehicle unique information database having the unique information about the rental vehicle accumulated therein, a facility unique information database having unique information about facility information accumulated therein in a state of being associated with position information, and a control program is stored, a server-side communication unit capable of connecting to the network, and a server-side action control unit configured to, based on the control program, refer to the user information database with regard to the user information supplied from the user terminal and, in a case where the user information matches registration information in the user information database, execute at least processing for permitting the user to use the rental vehicle and processing for recording a rental content of the rental vehicle on usage history data about the rental vehicle of the user in the user information database, and wherein the server-side action control unit executes each of processing for, based on the user information and the unique information about the rental vehicle transmitted from the user terminal, when having permitted the user to use the rental vehicle, referring to the rental vehicle unique information database, reading out rental vehicle unique information about the rental vehicle which the user has been permitted to use, and recording the rental vehicle unique information on the usage history data about the user in the user information database, processing for, based on a notice of return of the rental vehicle transmitted from the user terminal, recording a vehicle rental fee on the usage history data about the user in the user information database, processing for, based on the terminal position information obtained when the notice of return has been transmitted, referring to the facility unique information database, extracting unique information about a return destination facility to which the rental vehicle has been returned from the facility unique information database, and adding predetermined return destination facility provider points to provider data about the return destination facility in the facility unique information database, and processing for, in a case where the return destination facility to which the rental vehicle has been returned is the return destination facility previously designated, adding predetermined user points caused by regular return of the rental vehicle to the user information in the user information database.

With this, in operations of a rental vehicle system, points corresponding to the usage frequency (return destination facility provider points and user points) can be imparted to both a facility provider, which is a system operator providing, for example, a bicycle parking area, and a system user. With this, not only a user is able to obtain points corresponding to usage, but also a return destination facility provider (sponsor) for a bicycle parking area or the like in operating the rental vehicle system can expect collection of funds and becomes able to easily invest money, so that the spread of rental vehicle systems can be accelerated.

Moreover, it is favorable that the rental vehicle tag is further provided with an advertisement tag for causing the user terminal to display an advertisement, the management server further includes an advertisement database in which identification information about the advertisement tag and advertisement provider information are associated with each other, when the advertisement is displayed on the user terminal via the advertisement tag, the terminal-side action control unit executes processing for transmitting identification information about the advertisement tag to the management server via the terminal-side communication unit, and the server-side action control unit executes processing for extracting the advertisement provider information from the advertisement database based on the identification information about the advertisement tag, adding user points caused by advertisement displaying to the user information database, and recording a history of addition of the user points on the advertisement provider information in the advertisement database.

Moreover, it is more favorable that, when the advertisement is displayed on the user terminal, an advertisement spreading code for causing the advertisement to be displayed on another communication terminal is displayed in a downloadable manner, advertisement spreading code identification information in the advertisement spreading code is associated with the advertisement provider information in the advertisement database, and, when the advertisement is displayed on another terminal via the advertisement spreading code, the server-side action control unit executes processing for adding the user points caused by advertisement spreading to the user information database and recording a history of addition of the user points on the advertisement provider information in the advertisement database.

With these, since further advantages are brought about for the user, the spread of rental vehicle systems can be more promoted.

Moreover, it is favorable that the server-side action control unit executes processing for, based on the notice of return of the rental vehicle transmitted from the user terminal, referring to the rental vehicle unique information database and adding predetermined rental vehicle provider points to provider data about the rental vehicle in the rental vehicle unique information database.

With this, it becomes easy to find a sponsor with respect to provision of rental vehicles, and, to promote the collection of funds, the maintenance of rental vehicles becomes likely to be performed by the sponsor, so that a rental vehicle system can be maintained in a better condition.

Moreover, it is favorable that the server-side action control unit executes processing for imparting a reward corresponding to the return destination facility provider points to provider data about the return destination facility at intervals of a predetermined time. Moreover, it is favorable that the server-side action control unit executes processing for imparting a reward corresponding to the rental vehicle provider points to provider data about the rental vehicle at intervals of a predetermined time.

With these, since advantages which the provider of a return destination facility or the provider of a rental vehicle enjoys can be made attractive, the maintenance and operation cost of the return destination facility or the rental vehicle decreases, and facilities for rental vehicle systems become likely to be maintained, so that the spread of rental vehicle systems can be further promoted.

Moreover, it is favorable that, when having received, from the user, a notice indicating that the user wishes to use the user points, the server-side action control unit executes processing for deducting an amount of money corresponding to the user points added to the user in the user information database from the vehicle rental fee recorded on the usage history data about the user in the user information database.

With this, the user becomes able to use a rental vehicle substantially for low rates.

Moreover, it is favorable that the rental vehicle tag is arranged inside a frame of the rental vehicle.

With this, since not only the contamination or breakage of the rental vehicle tag can be prevented but also the abuse of the rental vehicle tag can be prevented, a fair rental vehicle system can be operated.

Advantageous Effects of Invention

According to a configuration of a rental vehicle operation management system of the present invention, since the system operator side is able to enjoy advantages corresponding to a degree of contribution thereof, such as provision of a facility required in operations of the system, it becomes possible to increase the number of facility providers in implementing operations for rental vehicles. Moreover, since the system user side is able to enjoy advantages corresponding to the use of the system, the use of the system is promoted. These enable promoting the spread of rental vehicle systems.

DESCRIPTION OF EMBODIMENTS

First Embodiment

Figure 1:
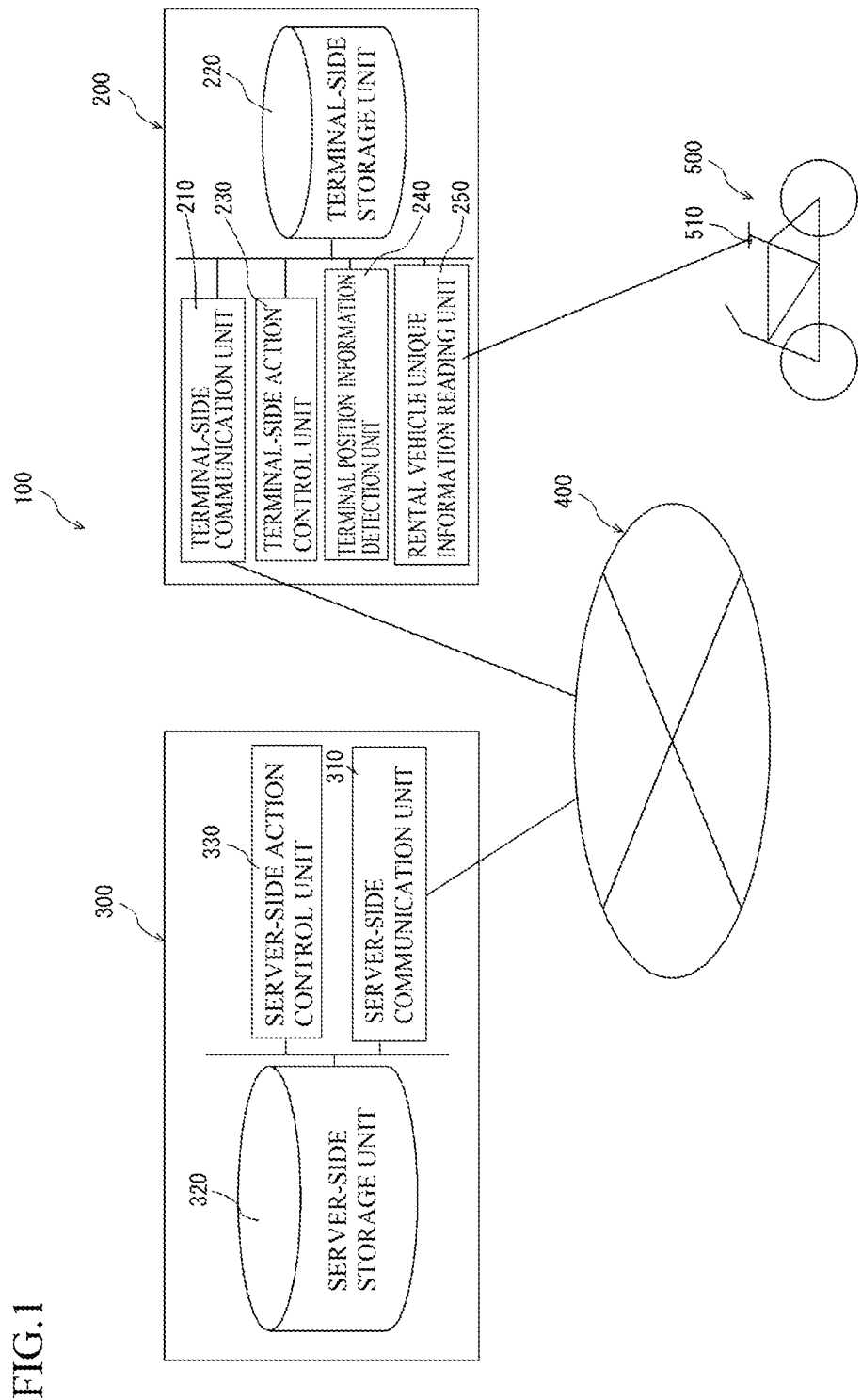
FIG. 1 is an explanatory diagram illustrating a schematic configuration of a rental vehicle operation management system in a first embodiment.

A rental vehicle operation management system 100 in the present embodiment includes a user terminal 200 and a management server 300 as illustrated in FIG. 1. The user terminal 200 and the management server 300 are able to connect to a network 400 via a terminal-side communication unit 210 and a server-side communication unit 310, respectively. The user terminal 200 and the management server 300 transmit and receive various pieces of data stored in a terminal-side storage unit 220 and a server-side storage unit 320, respectively, via the network 400. A terminal-side action control unit 230 and a server-side action control unit 330 operate in cooperation with each other based on various pieces of data transmitted via the network 400, thus causing the rental vehicle operation management system 100 to operate. While, in the present embodiment, a smartphone is used as the user terminal 200, a PC server is used as the management server 300, and the Internet is used as the network 400, a specific configuration can be changed as appropriate.

The user terminal 200 is able to connect to the network 400 via the terminal-side communication unit 210 as illustrated in FIG. 1. Moreover, the terminal-side storage unit 220 of the user terminal 200 has a terminal-side control program (rental vehicle operation management application) installed thereon and also has user information, which is owner information about the user terminal 200, accumulated therein by an input operation of the user. At least the user name is requested as the user information. A non-volatile memory typified by a flash memory is suitably used as such a terminal-side storage unit 220. Furthermore, a terminal position information detection unit 240, which is capable of detecting position information about the user terminal 200, is arranged in the user terminal 200. A GPS signal detection device is suitably used as the terminal position information detection unit 240.

Furthermore, a rental vehicle unique information reading unit 250, which is capable of reading unique information about a rental vehicle via a rental vehicle tag 510 attached to a rental vehicle 500 described below, is arranged in the user terminal 200. Here, the rental vehicle tag 510 is arranged on the underside surface of a saddle as illustrated in FIG. 1, but can be arranged on the outside surface of a frame. With regard to the rental vehicle unique information reading unit 250, a configuration corresponding to the type of the rental vehicle tag 510 is employed as appropriate. Specifically, in a case where the rental vehicle tag 510 is formed from a QR code (registered trademark in Japan) or a barcode, a camera and code reading software capable of reading these can be employed.

Moreover, in a case where the rental vehicle tag 510 is formed from a near-field communication tag, such as an RFID or non-contact IC card tag, the rental vehicle tag 510 can be arranged in the inner portion of the rental vehicle 500, which is typified by, for example, the internal surface of a frame of the rental vehicle 500. This enables preventing the contamination, breakage, or vandalism of the rental vehicle tag 510. Then, a near-field communication device can be employed as the rental vehicle unique information reading unit 250.

The user information accumulated in the terminal-side storage unit 220, the unique information about a rental vehicle read by the rental vehicle unique information reading unit 250, and the position information about the user terminal 200 (terminal position information) detected by the terminal position information detection unit 240 are transmitted by the terminal-side communication unit 210 and the terminal-side action control unit 230 to the management server 300 via the network 400. A central processing unit, which is typified by a CPU of a smartphone, is suitably used as the terminal-side action control unit 230.

Figure 2:
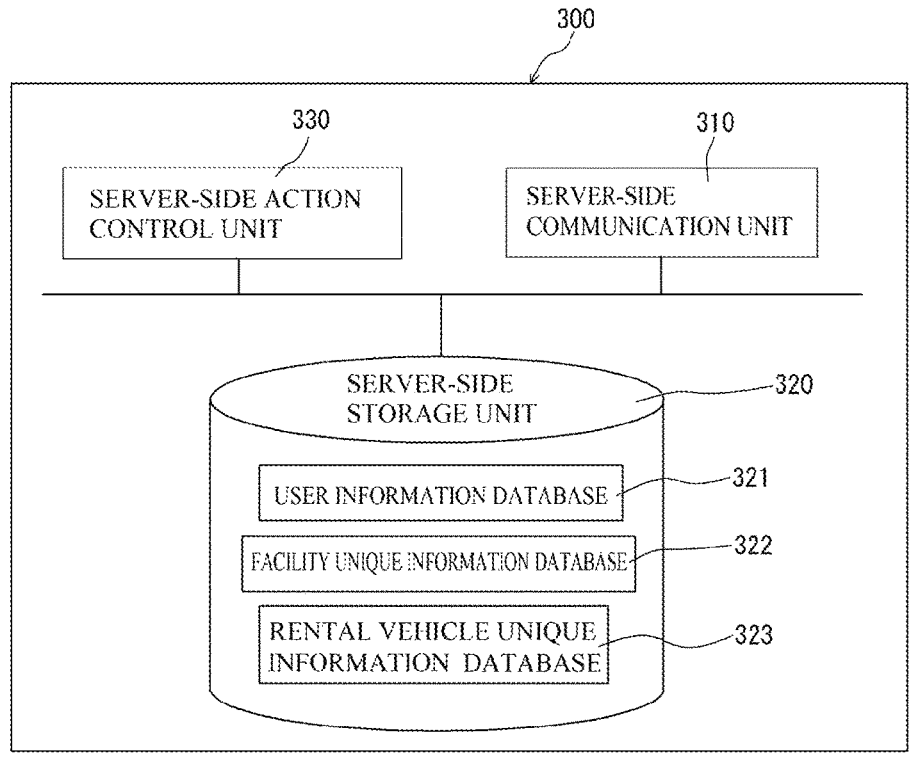
FIG. 2 is an explanatory diagram illustrating a schematic configuration of a management server in the first embodiment.

The management server 300 is able to connect to the network 400 via the server-side communication unit 310 as illustrated in FIG. 1 and FIG. 2. Moreover, a control program corresponding to a terminal-side control program (rental vehicle operation management application) is stored in the server-side storage unit 320 of the management server 300. Moreover, the server-side storage unit 320 includes a user information database 321, a facility unique information database 322, and a rental vehicle unique information database 323. A high-capacity non-volatile memory, which is typified by an HDD or SSD, is suitably used as such a server-side storage unit 320.

User information that was input from the user terminal 200 at an earlier time or at the time of use is accumulated in the user information database 321. In addition to a user name, at least a password and a method of settlement are input as the user information. Unique information related to facilities, such as a bicycle parking area serving as a return destination facility and a vehicle maintenance base, is accumulated in the facility unique information database 322 in a state of being associated with a provider and position information. Unique information about, for example, the owner or provider of the rental vehicle 500 and the vehicle state thereof is accumulated in the rental vehicle unique information database 323.

The user information transmitted from the user terminal 200, the unique information about a rental vehicle, and the position information about the user terminal 200 are referred to by the server-side action control unit 330 in the user information database 321, the facility unique information database 322, and the rental vehicle unique information database 323. The server-side action control unit 330 executes processing for determining, based on the user information database 321, whether the user information which a user has transmitted matches registration information in the user information database 321, a usage history of the previous rental vehicle 500 (for example, a payment status for a vehicle rental fee or a breakage record of the rental vehicle 500), or whether the rental vehicle 500 is available for use (whether the rental vehicle 500 is under rental), and executes processing for extracting the location of a bicycle parking area in which the rental vehicle 500 is parked from the facility unique information database 322. The server-side action control unit 330 transmits a method of unlocking the rental vehicle 500 to the user terminal 200 with respect to a user allowed to use the rental vehicle 500, and transmits a reason for unavailability to the user terminal 200 with respect to a user not allowed to use the rental vehicle 500.

Here, a configuration can be employed in which a wireless communications device and a remotely operable lock are previously attached to the rental vehicle 500 and the server-side action control unit 330 directly transmits an unlocking command for the remotely operable lock to the rental vehicle 500 designated by the user.

After providing the state in which the rental vehicle 500 is available for use to the user (permitting the use thereof), the server-side action control unit 330 refers to the rental vehicle unique information database 323 to read out rental vehicle unique information about the rental vehicle 500 permitted to be rented, and records (accumulates) the rental vehicle unique information on usage history data in the user information about the user permitted to use the rental vehicle 500 in the user information database 321. Next, the server-side action control unit 330 refers to the rental vehicle unique information database 323, and executes processing for adding predetermined rental vehicle provider points corresponding to the content of rental to data about the owner or provider of the rental vehicle 500 permitted to be rented (provider data about the rental vehicle).

When ending the use of the rental vehicle 500, the user performs a return procedure for the rental vehicle 500 via the terminal-side control program of the user terminal 200. When the user performs processing for transmitting a notice of return of the rental vehicle 500 to the management server 300, the terminal-side action control unit 230 detects position information about the user terminal 200 via the terminal position information detection unit 240, and transmits vehicle return position information together with the notice of return to the management server 300. When the management server 300 receives each of the user information, the notice of return, and the vehicle return position information, the server-side action control unit 330 refers to the facility unique information database 322, identifies a bicycle parking area to which the rental vehicle 500 has been returned, and also extracts owner or provider data about the owner or provider of the bicycle parking area identified as a vehicle return place (provider data about a return destination facility). The server-side action control unit 330 executes processing for adding predetermined return destination facility provider points associated with facility use to the extracted owner or provider data.

At that time, in a case where the return destination facility for the rental vehicle 500 is a return destination facility that was previously set at the time of rental, the server-side action control unit 330 executes processing for adding predetermined user points caused by a regular return of the rental vehicle 500 to the user information in the user information database 321. On the other hand, in a case where the return destination facility for the rental vehicle 500 is not a return destination facility that was previously set at the time of rental, the server-side action control unit 330 can be configured to execute processing for subtracting predetermined user points caused by an irregular return of the rental vehicle 500 from the user information in the user information database 321 or processing for adding an extra fee caused by return destination violation to the usage history data.

Moreover, the server-side action control unit 330 checks the time at which the notice of return was received from the user, makes a comparison with the initial content of rental (rental time), checks the presence or absence of excess of the rental time, and, when finding the excess of the rental time, executes processing for adding a predetermined extra fee associated with rental time excess to the usage history data in the user information database 321.

In a case where the user has submitted a notice of breakage data caused by use at the time of a return procedure for the rental vehicle 500, the server-side action control unit 330 executes, with respect to the rental vehicle unique information database 323, each of processing for recording the breakage data and processing for registering unavailability on the corresponding rental vehicle unique information, and also executes processing for making an arrangement for ordering a repair service from a bicycle repair service business operator. When making an arrangement for ordering a repair service, the server-side action control unit 330 also additionally communicates the current position of the rental vehicle 500 targeted for repair and the content of such repair. The server-side action control unit 330 refers to the user information database 321, and, unless the user is under a condition of exemption from responsibility, such as a breakage indemnification service, the server-side action control unit 330 executes processing for adding billing data for predetermined repair cost to the usage history data associated with the user information.

Moreover, when completing repair of the rental vehicle 500, the bicycle repair service business operator transmits, to the management server 300, a notice of repair completion together with unique information about the rental vehicle 500 read by a communication device such as a smartphone from the rental vehicle tag 510. Upon receiving the notice of vehicle repair completion, the server-side action control unit 330 refers to the rental vehicle unique information database 323, identifies the rental vehicle 500 with its repair completed, and also executes processing for registering availability for use on the rental vehicle unique information. At that time, the bicycle repair service business operator can be configured to additionally communicate the position information about the rental vehicle 500 to the management server 300. In a case where the current position information about the rental vehicle 500 is different from the position information obtained at the time of the notice of return, the server-side action control unit 330 executes correction processing for the current position information registered in the rental vehicle unique information database 323.

Moreover, upon receiving the notice of vehicle repair completion, the server-side action control unit 330 can execute processing for adding repair provision points to a bicycle repair service business operator registered in the facility unique information database 322.

The server-side action control unit 330 refers to usage history data associated with each piece of user information in the user information database 321 at intervals of a previously set time, such as on every last week day of the month, and performs a cost billing procedure for usage fees or the like with respect to each user. Specifically, the server-side action control unit 330 settles, for example, rental vehicle fees according to a previously registered method of settlement based on usage fees registered in the usage history data. Upon completing the settlement, the server-side action control unit 330 executes subtraction processing that is based on a result of settlement with respect to the usage fees registered in the usage history data.

Moreover, the server-side action control unit 330 refers to the facility unique information database 322, counts return destination provider points associated with the owner or provider of a facility such as a bicycle parking area, and executes processing for sending a reward corresponding to the number of points to the owner or provider of the facility based on a method of reward previously registered in the facility unique information database 322. In a similar way to this, the server-side action control unit 330 counts repair provision points added to a bicycle repair service business operator, and executes processing for sending a reward corresponding to the number of points based on a method of reward previously registered in the facility unique information database 322. Furthermore, the server-side action control unit 330 refers to the rental vehicle unique information database 323, counts rental vehicle provider points associated with the owner or provider of the rental vehicle 500, and executes processing for sending a reward corresponding to the number of points to the owner or provider of the rental vehicle 500 based on a method of reward previously registered in the rental vehicle unique information database 323. Such processing operations for sending rewards can be executed at the same timing as that of the billing processing for usage fees to users.

According to such a configuration of the rental vehicle operation management system 100 in the present embodiment, points corresponding to respective provided objects (rental vehicle provider points, return destination facility provider points, and repair provision points) are imparted to a provider of the rental vehicle 500, a provider of a return destination facility, such as a bicycle parking area, and a repair provider, which are the operator side of the rental vehicle operation management system 100. These points are able to be received as rewards corresponding to the number of points according to a previously set method, and are, therefore, able to lead to maintenance and operation cost for the provided objects (the rental vehicle 500, a return destination facility, such as a bicycle parking area, and the provision of a repair service) and incomes of the providers. With this, since facilities of the rental vehicle operation management system 100 can be always maintained in good condition, benefits can be provided to both the user and the facility provider, so that a function effect in which the use of the rental vehicle operation management system 100 is promoted can be favorably brought about.

Second Embodiment

Figure 3:
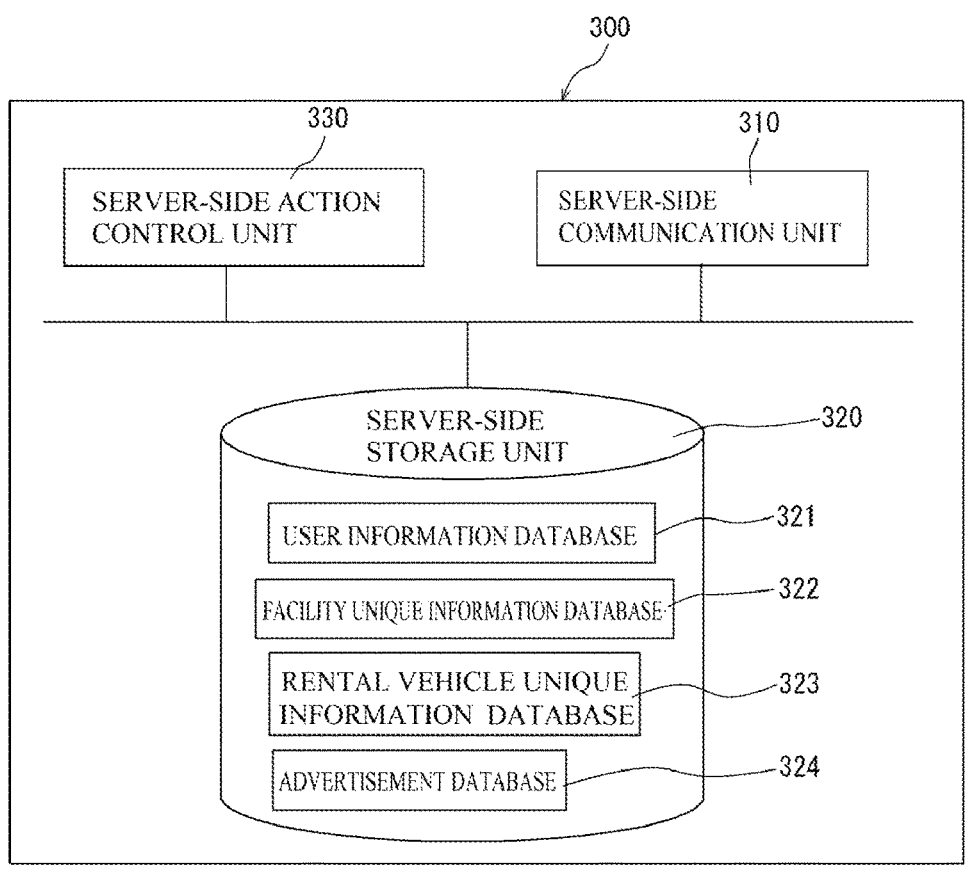
FIG. 3 is an explanatory diagram illustrating a schematic configuration of a management server in a second embodiment.

In the present embodiment, an advertisement tag for causing an advertisement to be displayed is appended to the rental vehicle tag 510 attached to the rental vehicle 500, and an advertisement database 324 in which identification information about the advertisement tag and advertisement provider information are associated with each other is additionally arranged in the management server 300 as illustrated in FIG. 3. With regard to other configurations, constituent parts similar to those of the first embodiment are assigned the respective same reference characters used in the first embodiment, and the detailed description thereof is, therefore, omitted. The configuration employed in the present embodiment is characteristic in that the user is able to acquire user points by reading the advertisement tag of the rental vehicle 500 and causing the user terminal 200 to display an advertisement.

The rental vehicle operation management system 100 according to the present embodiment is described. When the user accesses the rental vehicle tag 510 (advertisement tag) at the time of, for example, rental of the rental vehicle 500, the user terminal 200 requests the user to permit displaying of an advertisement. When the user permits displaying of an advertisement, a predetermined advertisement is displayed on the user terminal 200. When the advertisement is displayed on the user terminal 200, identification information and user information associated with the advertisement tag are transmitted from the terminal-side action control unit 230 of the user terminal 200 to the management server 300.

When the management server 300 receives the identification information about the advertisement tag, the server-side action control unit 330 refers to the user information database 321, extracts user information, and executes processing for adding user points caused by advertisement displaying to usage history data associated with the extracted user information. Moreover, the server-side action control unit 330 refers to the advertisement database 324, extracts advertisement provider information associated with identification information about the advertisement, and executes processing for recording, on the extracted advertisement provider information, a history of addition of user points to the user who has caused the advertisement to be displayed.

The acquired user points are made usable by transmitting, to the management server 300, a notice indicating that the user wishes to use the user points. Specifically, upon receiving a notice indicating that the user wishes to use the user points, the server-side action control unit 330 executes processing for deducting an amount of money corresponding to the user points from a vehicle rental fee based on a method previously registered in the user information database 321.

Moreover, a benefit which is provided to the user can be settled by the server-side action control unit 330 referring to the advertisement database 324 and charging an advertisement provider a cost corresponding to the user points provided to the user who has caused the advertisement to be displayed, based on the history of addition of user points. The benefit which the user can obtain due to the use of the user points is not limited to a reduction in vehicle rental fee, but can also be used as another known benefit. Employing such a configuration having the function of allowing the user to acquire user points with use of the advertisement tag (rental vehicle tag 510) attached to the rental vehicle 500 enables providing a more user-friendly rental vehicle operation management system 100.

Moreover, a configuration in which an advertisement spreading code which, when an advertisement is displayed on the user terminal 200 via an advertisement tag, also enables the advertisement to be displayed on another communication terminal is able to be downloaded to the terminal-side storage unit 220 of the user terminal 200 can also be employed. Advertisement spreading code identification information (for example, user information about the user who downloaded the advertisement spreading code and advertisement provider information) is associated with the advertisement spreading code. When the user who downloaded the advertisement spreading code transmits the advertisement spreading code to a communication terminal of the user's acquaintance with use of, for example, a social networking service (SNS) and the acquaintance causes an advertisement to be displayed on the acquaintance's communication terminal via the advertisement spreading code, a notice indicating displaying of an advertisement performed via the advertisement spreading code is communicated from the acquaintance's communication terminal to the management server 300.

Upon receiving the notice indicating displaying of an advertisement performed via the advertisement spreading code, the server-side action control unit 330 refers to the user information database 321, extracts user information associated with the advertisement spreading code, and executes processing for adding user points caused by advertisement spreading to the extracted user information under a previously registered condition. Likewise, the server-side action control unit 330 refers to the advertisement database 324, extracts advertisement provider information associated with the advertisement spreading code, and executes processing for recording a history of addition of user points.

The server-side action control unit 330 refers to the advertisement database 324 at intervals of a previously set time, counts the number of points of the history of addition of user points recorded in association with each piece of advertisement provider information, and executes processing for charging each advertisement provider a cost corresponding to the counted number of points. Furthermore, the server-side action control unit 330 can be configured to execute processing for, instead of recording a history of addition of user points recorded in association with advertisement provider information in the advertisement database 324, charging a cost corresponding to the counted number of points in the history of addition of user points on a pay-as-you-go basis or at intervals of a predetermined time.

According to the rental vehicle operation management system 100 in the present embodiment, in addition to using the rental vehicle operation management system 100, the user can acquire user points corresponding to displaying of an advertisement performed via an advertisement tag (rental vehicle tag 510) arranged in the rental vehicle 500 or spreading of the advertisement. Using such an advertisement tag also enables the provider of the rental vehicle 500 to charge an advertisement provider an advertisement installation fee caused by attachment of the advertisement tag. In the above-described way, a rental vehicle operation management system 100 which is advantageous to both the user and the operator (the provider of, for example, a facility) can be provided.

Moreover, while, in the above-described embodiments, a configuration in which a rental bicycle is used as the rental vehicle 500 has been described, the rental vehicle 500 is not limited to a rental bicycle but can be another type of vehicle, such as a two-wheel vehicle, for example, an electric power-assisted bicycle or a motorcycle, or a motorcar. Moreover, the provider of, for example, a facility in the above-described embodiments provides a rental vehicle, a return destination facility (bicycle parking area), and repair of a bicycle, but can also provide, for example, charging points for a battery. Furthermore, the present invention can also be applied to what is called a vehicle sharing service.

While, in the above-described embodiments, the terminal position information detection unit 240 of the user terminal 200 is used to identify the position of a bicycle parking area, a configuration in which a bicycle parking area tag with which data for identifying a bicycle parking area is associated, such as a two-dimensional barcode, is arranged in the bicycle parking area, the bicycle parking area tag is enabled to be read by a bicycle parking area tag reading means arranged in the user terminal 200, the read data about the bicycle parking area is transmitted to the management server 300, and the server-side action control unit 330 refers to the facility unique information database 322 to read unique information about the bicycle parking area can also be employed. Moreover, the advertisement tag can be arranged in a facility such as a bicycle parking area or a battery charging point and can be set as an advertisement tag with which unique information about the facility is associated. Such an advertisement tag being spread by an SNS enables attaining an effect similar to distributing a map of battery charging points to users. Furthermore, arranging a great number of battery charging points enables minimizing a battery which is to be mounted in, for example, an electric power-assisted bicycle.

Moreover, while, in the above-described embodiments, when the user is permitted to rent the rental vehicle 500, processing for recording unique information about the rental vehicle 500 on the usage history data in the user information database 321 of the management server 300 is executed, timing at which to record the unique information about the rental vehicle 500 on the usage history data can be the same as the time of a notice of return of the rental vehicle 500.

Moreover, the server-side action control unit 330 of the management server 300 can refer to the rental vehicle unique information database 323, extract the distribution of bicycle parking areas (return destination facilities) in which rental vehicles 500 are parked, and further refer to the facility unique information database 322. Then, the server-side action control unit 330 can extract bicycle parking areas which are tight in bicycle parking space, bicycle parking areas which are sufficient in bicycle parking space, or bicycle parking areas located near areas desired to attract gests, such as shopping areas, and set these areas as recommended bicycle parking areas. Furthermore, the server-side action control unit 330 can transmit position data about a recommended bicycle parking area for the rental vehicle 500 to the user terminal 200, and, when the user has returned the rental vehicle 500 to the recommended bicycle parking area, execute processing for adding user points.

As described above, not only bicycle parking spaces being disproportionately located can be reduced but also there is a convenience in that rental vehicles 500 can be evenly allocated to all of the bicycle parking areas. Moreover, a configuration in which provider points obtained by deducting introduction rebate points are imparted to the provider of a bicycle parking area set as a recommended bicycle parking area aimed at gest attraction can be employed. The introduction rebate points can also be used as resources reserved for management or the like of the entire rental vehicle operation management system 100 or at the time of a campaign.

What is claimed is:

1. A rental vehicle operation management system which includes a user terminal and a management server capable of connecting to a network and performs operation management of rental vehicles with the user terminal and the management server operating in cooperation with each other via the network,
wherein the user terminal includes:
a terminal-side storage unit on which a terminal-side control program is installed and in which user information is accumulated;
a terminal position information detection unit capable of detecting terminal position information about the user terminal;
a rental vehicle unique information reading unit capable of reading unique information about a rental vehicle via a rental vehicle tag attached to the rental vehicle;
a terminal-side communication unit capable of connecting to the network; and
a terminal-side action control unit configured to supply at least the user information, the terminal position information, and the unique information about the rental vehicle to the management server provided on the network via the terminal-side communication unit,
wherein the terminal-side action control unit executes each of:
processing the user information and the unique information about the rental vehicle read by the rental vehicle unique information reading unit to transmit to the management server;
processing a return of the rental vehicle and transmitting a notice of return of the rental vehicle and the terminal position information to the management server;
wherein the management server includes:
a server-side storage unit in which each of a user information database having the user information accumulated therein, a rental vehicle unique information database having the unique information about the rental vehicle accumulated therein, a facility unique information database having unique information about facility information accumulated therein in a state of being associated with position information, and a control program is stored;
a server-side communication unit capable of connecting to the network; and
a server-side action control unit configured to, based on the control program, refer to the user information database with regard to the user information supplied from the user terminal and, in a case where the user information matches registration information in the user information database, execute at least processing for permitting the user to use the rental vehicle and processing for recording a rental content of the rental vehicle on usage history data about the rental vehicle of the user in the user information database, and wherein the server-side action control unit executes each of:
processing for, based on the user information and the unique information about the rental vehicle transmitted from the user terminal, when having permitted the user to use the rental vehicle, referring to the rental vehicle unique information database, reading out rental vehicle unique information about the rental vehicle which the user has been permitted to use, and recording the rental vehicle unique information on the usage history data about the user in the user information database;
processing for, based on the notice of return of the rental vehicle transmitted from the user terminal, recording a vehicle rental fee on the usage history data about the user in the user information database;
processing for, based on the terminal position information obtained when the notice of return has been transmitted, referring to the facility unique information database, extracting unique information about a return destination facility to which the rental vehicle has been returned from the facility unique information database, and adding predetermined return destination facility provider points to provider data about the return destination facility in the facility unique information database; and
processing for, in a case where the return destination facility to which the rental vehicle has been returned is the return destination facility previously designated, adding predetermined user points caused by regular return of the rental vehicle to the user information in the user information database.

2. The rental vehicle operation management system according to claim 1, wherein the rental vehicle tag is further provided with an advertisement tag for causing the user terminal to display an advertisement,
wherein the management server further includes an advertisement database in which identification information about the advertisement tag and advertisement provider information are associated with each other,
wherein, when the advertisement is displayed on the user terminal via the advertisement tag, the terminal-side action control unit executes processing for transmitting identification information about the advertisement tag to the management server via the terminal-side communication unit, and
wherein the server-side action control unit executes processing for extracting the advertisement provider information from the advertisement database based on the identification information about the advertisement tag, adding user points caused by advertisement displaying to the user information database, and recording a history of addition of the user points on the advertisement provider information in the advertisement database.

3. The rental vehicle operation management system according to claim 2, wherein, when the advertisement is displayed on the user terminal, an advertisement spreading code for causing the advertisement to be displayed on another communication terminal is displayed in a downloadable manner,
wherein advertisement spreading code identification information in the advertisement spreading code is associated with the advertisement provider information in the advertisement database, and
wherein, when the advertisement is displayed on another terminal via the advertisement spreading code, the server-side action control unit executes processing for adding the user points caused by advertisement spreading to the user information database and recording a history of addition of the user points on the advertisement provider information in the advertisement database.

4. The rental vehicle operation management system according to claim 1, wherein the server-side action control unit executes processing for imparting a reward corresponding to the return destination facility provider points to provider data about the return destination facility at intervals of a predetermined time.

5. The rental vehicle operation management system according to claim 1, wherein the server-side action control unit executes processing for, based on the notice of return of the rental vehicle transmitted from the user terminal, referring to the rental vehicle unique information database and adding predetermined rental vehicle provider points to provider data about the rental vehicle in the rental vehicle unique information database.

6. The rental vehicle operation management system according to claim 5, wherein the server-side action control unit executes processing for imparting a reward corresponding to the rental vehicle provider points to provider data about the rental vehicle at intervals of a predetermined time.

7. The rental vehicle operation management system according to claim 1, wherein, when having received, from the user, a notice indicating that the user wishes to use the user points, the server-side action control unit executes processing for deducting an amount of money corresponding to the user points added to the user in the user information database from the vehicle rental fee recorded on the usage history data about the user in the user information database.

8. The rental vehicle operation management system according to claim 1, wherein the rental vehicle tag is arranged in an inner portion of the rental vehicle.

9. The rental vehicle operation management system according to claim 2, wherein the server-side action control unit executes processing for imparting a reward corresponding to the return destination facility provider points to provider data about the return destination facility at intervals of a predetermined time.

10. The rental vehicle operation management system according to claim 2, wherein the server-side action control unit executes processing for, based on the notice of return of the rental vehicle transmitted from the user terminal, referring to the rental vehicle unique information database and adding predetermined rental vehicle provider points to provider data about the rental vehicle in the rental vehicle unique information database.

11. The rental vehicle operation management system according to claim 2, wherein, when having received, from the user, a notice indicating that the user wishes to use the user points, the server-side action control unit executes processing for deducting an amount of money corresponding to the user points added to the user in the user information database from the vehicle rental fee recorded on the usage history data about the user in the user information database.

12. The rental vehicle operation management system according to claim 2, wherein the rental vehicle tag is arranged in an inner portion of the rental vehicle.

13. The rental vehicle operation management system according to claim 4, wherein the server-side action control unit executes processing for, based on the notice of return of the rental vehicle transmitted from the user terminal, referring to the rental vehicle unique information database and adding predetermined rental vehicle provider points to provider data about the rental vehicle in the rental vehicle unique information database.

14. The rental vehicle operation management system according to claim 4, wherein, when having received, from the user, a notice indicating that the user wishes to use the user points, the server-side action control unit executes processing for deducting an amount of money corresponding to the user points added to the user in the user information database from the vehicle rental fee recorded on the usage history data about the user in the user information database.

15. The rental vehicle operation management system according to claim 4, wherein the rental vehicle tag is arranged in an inner portion of the rental vehicle.

16. The rental vehicle operation management system according to claim 5, wherein, when having received, from the user, a notice indicating that the user wishes to use the user points, the server-side action control unit executes processing for deducting an amount of money corresponding to the user points added to the user in the user information database from the vehicle rental fee recorded on the usage history data about the user in the user information database.

17. The rental vehicle operation management system according to claim 5, wherein the rental vehicle tag is arranged in an inner portion of the rental vehicle.

18. The rental vehicle operation management system according to claim 7, wherein the rental vehicle tag is arranged in an inner portion of the rental vehicle.

\* \* \* \* \*